United States Patent [19]
Davis

[11] 4,134,303
[45] Jan. 16, 1979

[54] METHOD AND CIRCUIT FOR PROVIDING ELECTRICAL RUNOUT REDUCTION IN ROTATING SHAFT VIBRATION DETECTION SYSTEMS

[75] Inventor: Robert D. Davis, Spring Valley, Calif.

[73] Assignee: Spectral Dynamics Corporation, San Diego, Calif.

[21] Appl. No.: 817,340

[22] Filed: Jul. 20, 1977

[51] Int. Cl.² .............................................. G01M 1/22
[52] U.S. Cl. ................................................................ 73/660
[58] Field of Search .................. 73/660, 649, 659, 658

[56] References Cited
U.S. PATENT DOCUMENTS

| | | | |
|---|---|---|---|
| 3,681,978 | 8/1972 | Mathias et al. | 73/660 |
| 3,911,731 | 10/1975 | Walker et al. | 73/660 |
| 4,004,464 | 1/1977 | Himmler | 73/660 X |

Primary Examiner—Jerry W. Myracle
Attorney, Agent, or Firm—Brown & Martin

[57] ABSTRACT

A method and circuit for reducing by electrical runout subtraction, the runout signal portion of a composite runout signal and vibration signal, which runout subtraction signal is provided by a pre-programmed digital memory circuit module, PROM, that is selectively inserted into the circuit for a given rotating shaft. The PROM is accessed by a phase lock loop, master dynamic clock, synchronized to the tachometer signal, which provides the subtract signal in digital form that is changed to an analog signal and then fed with the composite signal to a differential amplifier circuit that subtracts the PROM waveform from the composite signal. In one mode the subtract amplifier circuit is inhibited in operation when the tachometer signal falls below a given CPM, or when the tachometer signal is lost.

14 Claims, 5 Drawing Figures

METHOD AND CIRCUIT FOR PROVIDING ELECTRICAL RUNOUT REDUCTION IN ROTATING SHAFT VIBRATION DETECTION SYSTEMS

BACKGROUND OF THE INVENTION

Proximity probes or eddy current probes have proven to be one of the best transducers in rotating shaft vibration monitoring systems. These non-contact sensors are used to measure shaft vibrations or movements in systems that diagnose the condition of the machinery or shaft, and in dynamically balancing the shaft. The proximity probes measure the spacing between the probe mounted in the case housing and the shaft during operational shaft rotation. Changes in this spacing reflect vibration in the shaft, which if excessive can seriously damage the machinery. It is the detection of this vibration signal that is a prime object of shaft vibration monitoring.

However, eddy current probes suffer the limitation of runout signals. Runout is the mechanical imperfection in machine shafts. It is also been adopted as the name for the output signal of a vibration pick-up that does not represent shaft vibratory motion, but is caused by the eccentricity of the shaft, surface irregularities, and by properties of the shaft material that causes the vibration probe to give an incorrect vibration signal. This incorrect signal is called "electrical runout" or "runout signals," and it is this runout that presents the machinery manufacturers with major difficulties since the electrical runout signal often exceed the magnitude limit acceptable in determining the magnitude of the vibration signal. While mechanical runout can be reduced by proper finishing of the surface that the probe is going to observe, and methods such as shaft-peening and burnishing have been developed to reduce electrical runout, these techniques have only been partially successful. It has been suggested to derive an electrical signal that corresponds to the "electrical runout" and then subtract this electrical runout signal from the composite runout signal and vibration signal. However, such systems have not left the laboratories stage and have not proven effective in actual use in rotating equipment environments and do not use or employ circuits that provide simple, inexpensive and reliable performance.

It is therefore advantageous to have a circuit for reducing the electrical runout from a composite runout and vibration signal generated in a proximity probe circuit, that has a selective memory containing subtracting runout signals corresponding to a given rotating shaft, which memory circuit is an IC or module insertable into circuit components that are mounted adjacent the proximity probe, and provides a vibration signal output with reduced electrical runout and that is effectively processed to determine with a higher degree of accuracy the vibration movement of the rotating shaft being monitored.

SUMMARY OF THE INVENTION

In an exemplary embodiment of this invention, the method and circuit functions to reduce by a subtract runout signal the runout signal portion of a composite runout signal and vibration signal generated in a proximity probe circuit by the rotating shaft that is being monitored. The composite signal is synchronized with the rotating shaft tachometer signal. A pre-programmed digital memory circuit module, PROM, stores the subtract runout signal corresponding to the particular rotating shaft that is being monitored. This pre-programmed digital runout signal is synchronized with the particular tachometer signal for the given rotating shaft. So the particular subtract runout signal is generated for the particular rotating shaft, and is subtracted from the same electrical runout signal picked up by the probe circuit in rotation of the shaft.

This digital runout signal in the PROM is accessed by a clock signal that is synchronized with the tachometer signal and provides a sequence of output counts that are fed to an address counter. The address counter accesses the PROM that contains the digital subtract runout signal. The digital runout signal thus accessed is fed to a digital to analog converter that converts the runout signal to an analog signal. This analog subtract runout signal is then fed along with the composite signal to a subtract amplifier circuit. This circuit generally comprises differential amplifiers that subtract the stored analog signal from the composite signal, reducing the runout signal portion of the composite signal and allowing the vibration signal to pass therethrough and be detected in the analyzing monitors.

The use of PROM module circuits allows quick and easy programming for given rotating shafts, which modules are easily and quickly changed for different shafts, providing a flexible, operational system.

The runout subtract circuit also includes means for detecting when the shaft rotation input to the circuit is below a given CPM, such as 300 CPM. At this low CPM the phase lock loop circuit of the count generator cannot hold the locked condition; and thus a misleading output occurs. So in this event, a frequency detector and lock logic circuit provides an output that inhibits the subtract amplifier circuits, in addition the lock logic will detect the total loss of the tachometer signal and inhibits the subtract amplifier circuits. Also, the subtract signal is fed through a gate to the subtract amplifier circuits. When the gate is closed, the composite signal passes through uncorrected, giving an indication through the monitor of the effectiveness of the removal of the runout signal portion of the composite signal by the method and circuit.

It is therefore an object of this invention to provide a new and improved circuit for reducing the electrical runout signal portion of a composite runout signal and vibration signal generated in eddy current type proximity probe circuits used in monitoring rotating shafts.

Other objects and many advantages of this invention will be more apparent upon a reading of the following detailed description of an examination of the drawings, wherein like reference numerals designate like parts throughout and in which.

Figure 3:
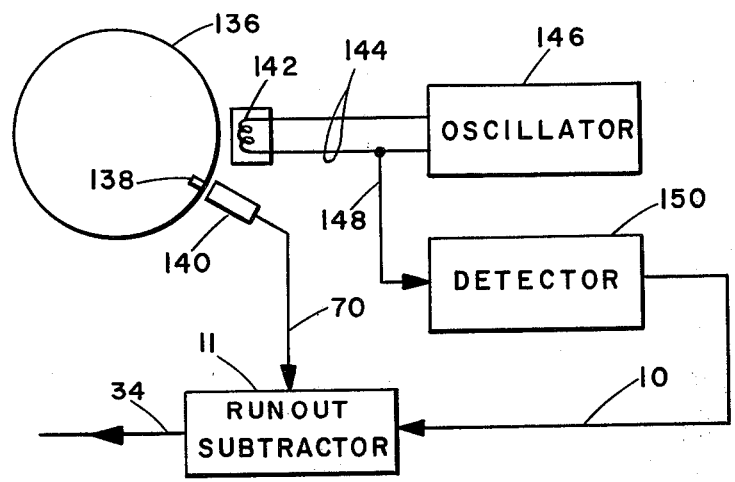
FIG. 3 is a schematic and block diagram of the overall runout subtractor circuit of FIG. 1, in the composite proximity probe circuit and tachometer circuit for monitoring a rotating shaft.

Referring to FIG. 3, the rotating shaft 136 to be monitored rotates in either a clockwise or counterclockwise direction. The shaft has a slot 138 that in cooperation with tach probe 140, provides a tach signal per revolution that is fed through line 70 to the runout subtractor circuit 11. The eddy current proximity probe 142, is positioned immediately adjacent the outer surface of the rotating shaft 136. The nominal gap between the probe 142 and the rotating shaft 136 depends on the parameters of the two components, but it is generally in the order of 40 milliinches gap. The oscillator 146 normally generates an oscillating signal that may be in the order of 2 megahertz, that is fed through lines 144 and through a coil or the like in the known probe circuit 142. The shaft 136 induces into the coil in probe 142 an electrical signal that modifies the sine wave in the coil from the oscillator 146. The conductivity as well as the permeability of the shaft 136 and its surface condition and its spacing, have a distinct effect on the sine wave signal in the coil in 142, as reflected in the oscillating signal that is picked off by line 148 and fed to the detector circuit 150. The known detector circuit 150 provides a DC output having a magnitude commensurate with or proportional to the degree to which the sine wave in the oscillator probe circuit 142, 144, and 146 is modified by the changing of the "gap" between transducer 142 and the surface of the shaft 136, during vibration of the shaft in rotation; and also by that which reflects the "electrical runout" signal. The DC output of the detector 150 is fed through line 10 to the runout subtractor circuit 11. The runout subtractor circuit 11 then provides an output through line 34 in a manner that will be described hereinafter.

Figure 1:
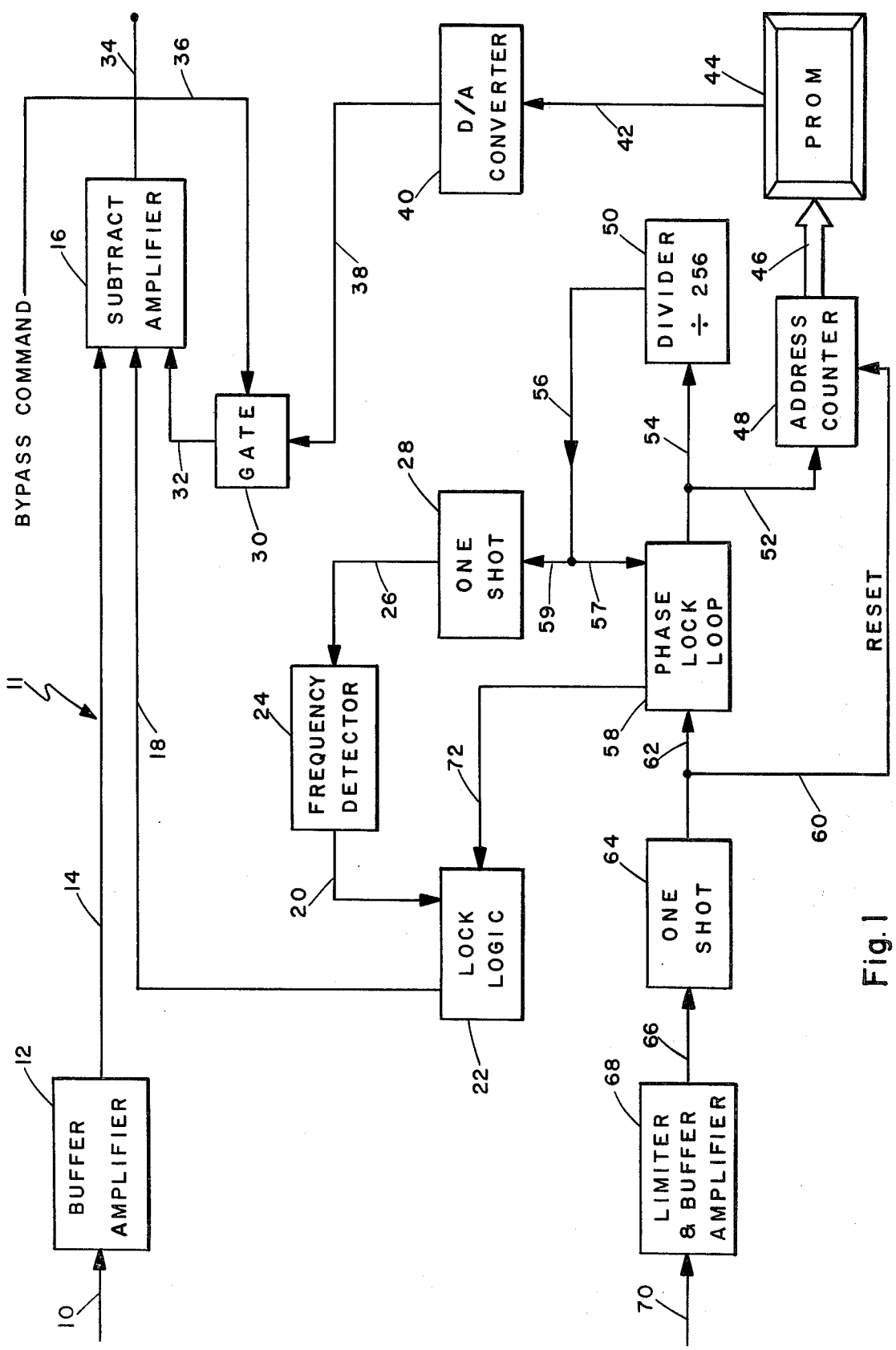
FIG. 1 is a block diagram of the circuit.

Referring now to FIG. 1, the DC output of detector 150 from the probe circuit is fed through line 10 to the buffer amplifier 12 and through line 14 to the subtract amplifiers circuit 16. Simultaneously, the tach signal is fed through line 70 and through the limiter and buffer amplifier circuit 68 and through line 66 to the one-shot multi-vibrator circuit 64. The one-shot 64 provides correctly shaped output pulses that are fed through line 62 to the phase lock loop circuit 58. The phase lock loop circuit 58 functions as a 256 count multiplier circuit that provides 256 counts in lines 52 and 54 for each tachometer input signal. Divider circuit 50 divides the 256 counts by 256, providing an out signal on line 56 that is fed back through line 57 to the phase lock loop circuit 58 that is coherent with the input signal in line 62 when the phase lock loop circuit is in lock. The output of the one-shot 64 is also fed through the reset circuit 60 that resets to 0 count the address counter 48. Upon being reset, address counter 48 then receives and counts the 256 counts from the phase lock loop circuit 58 through line 52, and feeds these output counts through lines 46 to the programmable read only memory or PROM 44.

Figure 4:
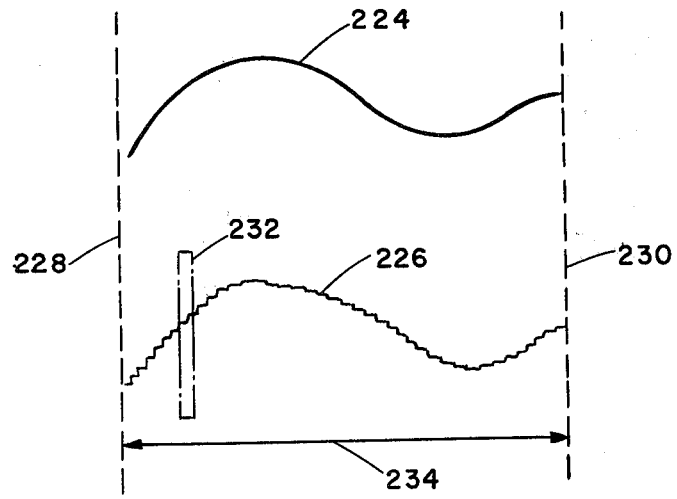
FIG. 4 is a diagram of the runoff signal portion of the composite signal, the stored digital subtract runout signal.

The PROM 44 is a pre-programmed digital memory circuit module or IC that is an easily and quickly insertable and removably component from the runout subtractor circuit 11. The PROM circuit comprises 256, 8-bit words. Each of these 8-bit words are programmed to contain the digital equivalent of the analog representation of the electrical runout for the particular shaft being monitored. This PROM circuit 44 is pre-programmed in a programming circuit wherein the shaft 136 is slow rolled with the detected electrical runout wave form, see FIG. 4, synchronized to the tachometer, is changed to digital form and then correctly addressed and inserted into the memory slots of the PROM 44. As illustrated in FIG. 4, the representative electrical runout analog signal generated by slowly rolling the shaft 136, is waveform 224. The corresponding digital subtract runout signal stored in PROM 44 is waveform 226. Signal 226 comprises 256, 8-bit words that provides slices 232 in the complimenting waveform 226 versus 224, that is used to balance out the electrical runout. The utilizing of the 8-bit word in the PROM provides 256 levels for establishing the magnitude of the particular sliced value 232 of electrical runout and the 256 slices or segments of one revolution of the shaft 136.

Figure 2:
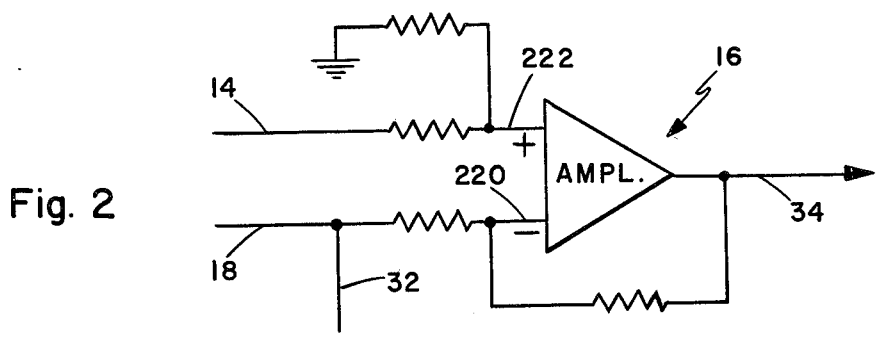
FIG. 2 is a circuit diagram exemplary of the subtract amplifier circuit of FIG. 1.

Thus, the address counter circuit 48 provides the 256 output counts that access the 256 memory slots of PROM 44 and provides the digital output through line 42 to the D to A converter 40 that changes the signal 226 in FIG. 4 to the analog signal 224 in line 38 that is fed through gate 30. Gate 30 is normally open and passes the analog subtract runout signal through line 32 to the subtract amplifiers circuit 16. The subtract amplifiers circuit 16 comprise differential amplifier circuits which may be as illustrated in FIG. 2. The operational amplifier 216 receives the composite signal from line 14 and the electrical runout subtract signal from line 32, which signals are fed through respective lines 222 and 220 to the operational amplifier 216 that then subtracts runout signal of line 220 from the larger composite signal in line 222. This provides the corrected signal waveform out the output line 34. This corrected output is then supplied to a known subsequent monitor or analyzer circuit or the like.

The feedback signal in line 56 of the phase lock loop circuit 58 is also fed through line 59 to the one-shot circuit 28 that provides an output in line 26 for each tach signal fed through line 70. The signal in line 26 is fed to the frequency detector 24, that detects the RPM of the monitored shaft 136. When the shaft rotation is too slow, that is when the RPM or CPM is below that which will allow the phase lock loop 58 to maintain lock condition, or is below the RPM that the shaft was rotated in slow roll to provide the information in PROM 44, then the frequency detector either provides a signal through line 20 to the lock logic 22 that provides a corresponding output signal in line 18, or the phase lock loop circuit 56 provides an out of lock signal in line 72 to the lock logic circuit 22 that in turn provides a corresponding output signal in line 18. The corresponding output signal in line 18 is a relatively large voltage that drives the amplifier 216 to a large negative output in line 34, in the order for example 20 volts, which when received by the analyzing monitor is detected by the analyzing monitor as showing that the runout subtractor 11 has become inoperable. Thus the user in viewing the output of the monitor is not mislead by the spurious signals that could otherwise be reflected in the monitor by the out of lock or low RPM condition in the runout subtractor 11.

In operation of the circuit, the particular pre-programmed PROM circuit module 44 is inserted into the circuit 11 and then the shaft 136 is rotated at its given operational speed and is monitored in the normal manner with the runout subtractor circuit 11 removing the runout electrical signal from the composite signal in line 14. Gate 30 may be selectively closed by any electrical command or by closing a switch manually, or the like, which cuts off the runout signal to the subtract amplifier circuit 16. The user is thus able to monitor the actual signal generated by the probe and detector circuits 142 and 150, both as corrected by the subtractive electrical runout signal and in the uncorrected condition.

Figure 5:
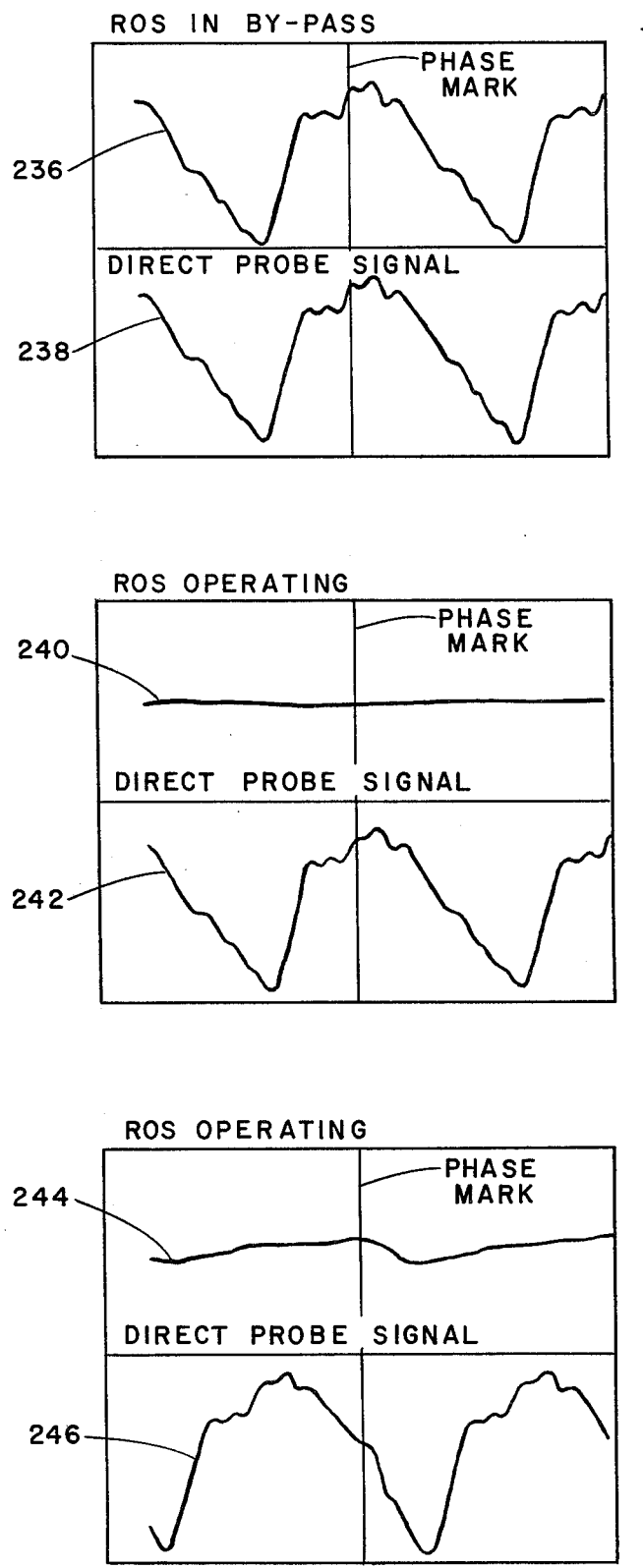
FIG. 5 are diagrams of runout signals, direct probe signals, runout signals that are corrected by the subtract runout signals, and corrected composite signals.

In referring to FIG. 5, waveform 236 represents a given illustrative electrical runoff signal as generated in a slow rolling of the shaft 136, that would be fed to line 10 in FIG. 1. Waveform 238 is the direct probe signal at this low RPM of, for example 600 RPM, that shows that the direct probe signal has little or no vibration signal component at this low RPM and comprises almost wholly the runout electrical signal.

Waveform 242 is the direct probe signal at 600 RPM while waveform 240 illustrates the runout electrical signal portion as being corrected by the application of the subtract runout signal in line 32. The two signals, 224 and 246, reflect that at 6000 RPM the resultant direct probe signal 246 includes the runout electrical error signal 238, and the composite signal 246 as corrected in waveform signal 244 in line 34.

Having described my invention, I now claim:

1. A circuit for reducing by an electrical subtraction, the runout signal portion of a composite electrical runout signal and vibration signal, said circuit comprising,
   a proximity probe circuit for generating said composite signal in response to the rotations of a rotating shaft,
   a tachometer probe circuit for generating a tachometer signal that synchronizes said composite signal with said rotating shaft,
   a pre-programmed digital memory circuit module storing a subtract electrical runout signal for the rotating shaft, which runout signal is synchronized with the tachometer signal,
   clock means synchronized to the tachometer signal for providing a sequence of output counts,
   address means for accessing said digital memory in response to said output counts providing the digital subtract runout signal,
   D to A converter means for converting said digital subtract runout signal to an analog subtract runout signal,
   subtract means for receiving said composite signal and said analog subtract runout signal and subtracting said analog subtract runout signal from said composite signal,
   and said memory circuit module being selectively removable from said circuit and replaceable by another memory circuit module pre-programmed with a subtract runout signal for another given rotating shaft.

2. A circuit as claimed in claim 1, wherein, said memory circuit module comprising a removable programmable read only memory circuit,
   and said clock means comprising a phase lock loop circuit for providing a given number of counts for each tachometer signal.

3. A circuit as claimed in claim 2 including,
   frequency detector means responsive to said output counts for providing an output signal when said tach signal is outside the range of a given number of revolutions per minute,
   and lock circuit means responsive to said frequency detector output signal for providing a lock signal inhibiting said subtract means from subtracting said analog subtract runout signal from said composite signal.

4. A circuit as claimed in claim 3 wherein, said subtract means comprising a differential amplifier detector circuit,
   and said lock signal from said lock circuit means driving said amplifier to a given negative output signal that is of larger magnitude than the composite signal.

5. A circuit as claimed in claim 1 including,
   gate means for gating said analog subtract electrical runout signal to said subtract means,
   and means for closing said gate means whereby the output of said subtract means then comprises the composite signal.

6. The method of reducing by an electrical subtract runout signal the runout data signal portion of a composite electrical runout signal and vibration signal generated in a proximity probe circuit by a rotating shaft, which composite signal is synchronized with the rotating shaft tachometer signal, comprising the steps of,
   placing a pre-programmed digital memory circuit module that stores a subtract runout signal for the rotating shaft, which runout signal is synchronized with the tachometer signal, into a given circuit,
   through said given circuit providing a series of output counts synchronized to the tachometer signal for accessing the digital memory and providing the digital subtract runout signals,
   converting the digital subtract runout signal to an analog subtract runout signal,
   feeding the subtract runout signal and the composite signal to a subtract circuit that subtracts the subtract runout signal from the composite signal,
   and selectively changing the memory circuit module to provide a different subtract runout signal for a different rotating shaft.

7. The method as claimed in claim 6 including the steps of,
   using a phase lock loop circuit to synchronize the output counts with the tachometer signal,
   feeding the phase lock loop circuit output counts to an address counter that accesses the memory circuit module,
   and detecting a low count of said output counts and inhibiting the subtract circuit when said tachometer signal reflects a rotating shaft RPM that is below a set RPM.

8. The method as claimed in claim 7 including the step of,
   providing a controlling signal to said subtract amplifier when said tachometer signal falls below a given count per minute that has an analog magnitude substantially larger than the analog magnitude of the composite signal.

9. The method as claimed in claim 8 including the step of,
   selectively gating the subtract runout signal to said subtract circuit, whereby the output of the subtract circuit is the composite signal without subtracting the subtract runout signal.

10. A circuit for reducing by an electrical subtract runout data signal comprising,
    transducer means for being positioned adjacent a given rotating shaft and generating a composite electrical runout signal and vibration signal generated in response to rotation of said rotating shaft at substantially operation speed,
    tach generating means for generating a tach signal with each rotation of said rotating shaft,
    detector means responsive to said composite electrical signal for detecting and providing a DC analog composite signal output proportional to the magnitude of the composite electrical runout signal and vibration signal, a pre-programmed digital memory circuit module storing a subtract electrical runout signal for the rotating shaft, which runout signal is synchronized with the tachometer signal, clock means for receiving and synchronizing to the tachometer signal and providing a sequence of output counts, address means for accessing said digital memory in response to said output counts providing the digital subtract runout signal, D to A converter means for converting said digital subtract runout signal to a DC analog subtract runout signal, subtract means for receiving said DC analog composite signal and said analog subtract runout signal and subtracting said analog subtract runout signal from said composite signal, and said memory circuit module being selectively removable from said circuit and replaceable by another memory circuit module pre-programmed with a subtract runout signal for another given rotating shaft.

11. A circuit as claimed in claim 10, wherein,
said memory circuit module comprising a removable programmable read only memory circuit, and said clock means comprising a phase lock loop circuit for providing a given number of counts for each tachometer signal.

12. A circuit as claimed in claim 11 including,
frequency detector means responsive to said output counts for providing an output signal when said tach signal is outside the range of a given number of revolutions per minute, and lock circuit means responsive to said frequency detector output signal for providing a lock signal inhibiting said subtract means from subtracting said analog subtract runout signal from said composite signal.

13. A circuit as claimed in claim 12 wherein,
said subtract means comprising a differential amplifier detector circuit, and said lock signal from said lock circuit means driving said amplifier to a given negative output signal that is of larger magnitude than the composite signal.

14. A circuit as claimed in claim 10 including,
gate means for gating said analog subtract electrical runout signal to said subtract means, and means for closing said gate means whereby the output of said subtract means then comprises the composite signal.

* * * * *